United States Patent [19]

Giebeler

[11] Patent Number: 4,557,509
[45] Date of Patent: Dec. 10, 1985

[54] HIGH PRESSURE SWIVEL COUPLING

[75] Inventor: James F. Giebeler, San Bernardino, Calif.

[73] Assignee: Emco Arrowhead, San Bernardino, Calif.

[21] Appl. No.: 613,873

[22] Filed: May 24, 1984

[51] Int. Cl.⁴ .............................................. F16L 27/00
[52] U.S. Cl. .................................... 285/281; 285/419; 285/373; 285/98; 285/168; 285/112
[58] Field of Search ................. 285/281, 419, 373, 98, 285/168, 272, 112, 278

[56] References Cited

U.S. PATENT DOCUMENTS

| | | | |
|---|---|---|---|
| 1,989,980 | 2/1935 | Hamer | 285/112 |
| 2,341,449 | 2/1944 | Krone et al. | 285/98 X |
| 2,643,140 | 6/1953 | Scheiwer | 285/112 X |
| 3,195,931 | 7/1965 | Braunagel | 285/98 X |
| 4,407,533 | 10/1983 | Giebeler | 285/281 |

FOREIGN PATENT DOCUMENTS 165423 11/1954 Australia ............................. 285/272

Primary Examiner—Richard J. Scanlan, Jr.
Attorney, Agent, or Firm—Lyon & Lyon

[57] ABSTRACT

A device for coupling two pipe sections together such that each of the connected pipe sections may swivel relative to the other. Each of the pipe sections have uniform and equal exterior diameters into which circumferential grooves, preferably a pair, are formed. The pipe sections are held together by a split clamp having inwardly extending ribs which mate with the grooves formed in the pipe sections. The size of the pipe section grooves and the split clamp ribs provide an annular space in each groove inwardly of the split clamp rib in which resides a compressible bearing ring. A washer ring separates and seals between the ends of the two pipe sections. The resulting pipe coupling is largely symmetrical about both its radial and axial centerpoint planes. Under pressure, the load is equalized over the multiple bearing rings.

4 Claims, 3 Drawing Figures

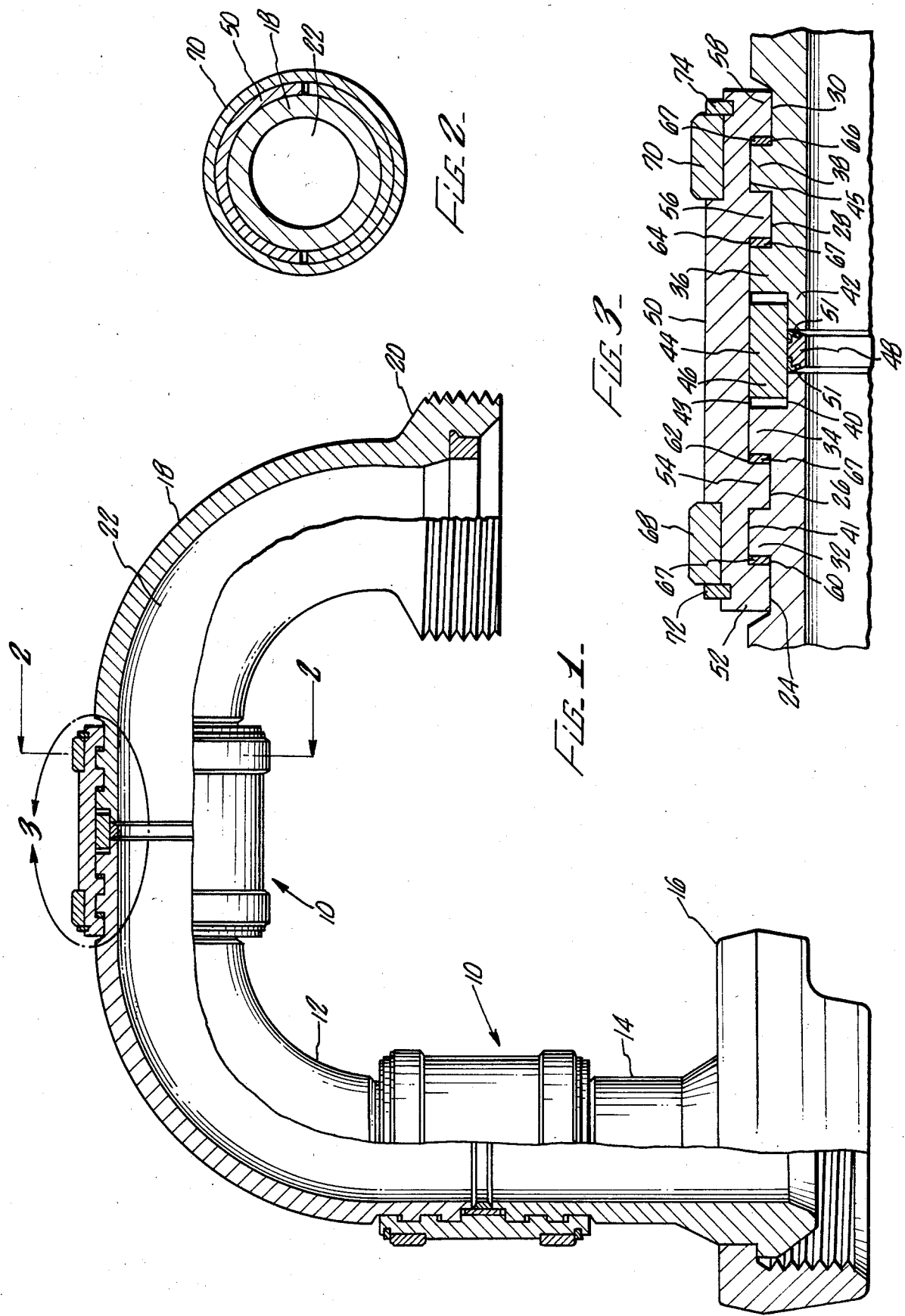

HIGH PRESSURE SWIVEL COUPLING

BACKGROUND

This invention pertains to mechanical pipe couplings, the ends of which swivel relative to one another even under extremely high fluid pressure. These type couplings find primary utility in oil well drilling and service operations, such as the pumping of drilling mud, fracturing, and squeeze cementing.

In the typical oil well drilling operation, there is a seemingly endless need to string pipe lines to move the various fluids used and encountered during drilling and service. These lines are moved and modified often. Further, the terrain over which these lines must run will often be uneven. Accordingly, it is virtually impossible to make the required connections using the standard straight pipe and connectors. Rather, swivel couplings are an absolute necessity, as they provide the flexibility required for rapid laying and dismantling of pipelines. The prior art is, therefore replete with swivel couplings of various designs.

As the pipe typically encountered at the oil well is large, usually two to four inches in diameter, and because the pipe sections are typically moved and installed by manual labor, it is important that the swivel couplings be as light-weight as possible, without sacrificing the strength or flexibility required by the job. Further, because a great number of these swivel couplings will be utilized at each well site, expense is also an important consideration. Accordingly, a design goal is to simplify the swivel coupling for ease of manufacture, as this permits lower cost. Most importantly, however, the swivel couplings must be strong—able to withstand not only the extremely high fluid pressures, but also the pulsating action and rough handling to which they are routinely subjected. These multiple goals, inherently divergent, are difficult to obtain. Indeed, the prior art swivel coupling designs have suffered from one or more of the drawbacks of heavy weight, high expense or poor performance.

SUMMARY OF INVENTION

The coupling of this invention circumvents the drawbacks encountered in the prior art designs and provides a swivel coupling characterized by its light weight, ease of manufacture, and its ability to provide full swivel action at high pressure and to withstand the pulsating action and rough handling commonly encountered in use.

The coupling of this invention comprises a pair of pipe sections which are held together by a split clamp. The split clamp is symmetrical about its radial and axial centerpoint planes. The ends of the pipe sections within the split clamp are mirror images of one another. This provides substantial cost benefits in and of itself in that the inventory of replacement parts may be reduced, as the same pipe section configuration will fit either side of the swivel coupling, and the split clamp may be used in right or left hand orientations. The ends of the pipe sections which reside within the split clamp and the coupling do not have intricate or complex configurations, such as upsets or flange portions, which are difficult and expensive to machine. Rather, the pipe sections have a uniform exterior diameter, with circumferential grooves (preferably a pair thereof) formed exteriorly therein. These grooves are easily machined in the uniform diameter exterior of the pipe sections. The split clamp also does not have an intricate or complex configuration. Rather, its cross-sectional configuration is one of protruding ribs which mate with the corresponding grooves on the pipe sections, such that the resulting combination of the pipe sections and the split clamp is largely symmetrical about its radial and axial centerpoint planes.

The size and location of the split clamp ribs are such that when they are positioned within the corresponding grooves on the pipe sections, there is a small annular space between the rib and the outwardly facing lateral face of each groove. Into each of these annular spaces, a compressible bearing ring is placed. When the coupling is under pressure, the two pipe sections will be forced away from one another, thereby compressing the bearing rings. Because the bearing rings are compressible, the pressure will be equalized over all of the bearings. Accordingly, the swivel action of the coupling is not hindered as a result of one overloaded bearing. Further, this sharing of the load between the multiple bearing rings reduces the instance of stress fractures which also can result from an overloaded bearing.

It is therefore the object of this invention to provide an improved swivel coupling.

DESCRIPTION OF THE FIGURES

FIG. 1 is a side view of a typical swivelling pipe connection which utilizes two of the swivel couplings of this invention, having a portion cut away to show the coupling in cross-section. Using two couplings in this manner allows for connections to be made through several different angles.

FIG. 2 is a radial cross-section taken along line 2—2 in FIG. 1.

FIG. 3 is an axial cross-section of one-half of the coupling shown in isolation.

DESCRIPTION OF THE PREFERRED EMBODIMENT

The swivel coupling of this invention, generally designated 10, is commonly used in tandem with an elbow pipe section 12 between them, a straight pipe section 14 having a female union 16 extending from the opposite end of one of the couplings 10 and another elbow section 18 having an upset male union 20 extending from the other end of the second coupling 10. Inasmuch as the coupling of this design provides for full swivel action of both pipe sections extending therefrom, this arrangement allows for the building of pipe connections at a myriad of differing angles. It will be recognized, however, that the coupling 10 can be utilized with any type pipe sections.

The coupling 10 is generally symmetrical about its axial and radial centerpoints. The ends of pipe section 12 and pipe section 18 which reside within the coupling are mirror images of one another. Each end of pipe sections 12 and 18 has a generally uniform exterior diameter and an interior annular passageway 22 which permits the flow of material therethrough. A pair of circumferential grooves 24 and 26 are formed in pipe section 12. A similar pair of grooves 28 and 30 are formed in pipe section 18. The formation of the grooves 24 and 26 and 28 and 30, respectively, create lugs 32 and 34, and 36 and 38, in the pipe sections 12 and 18, respectively. Lugs 34 and 36 are also formed by reduced exterior diameter portions 40 and 42 in the ends of pipe sections 12 and 18, respectively. The reduced diameter portions 40 and 42 provide space for the ring 44, shown in isolation in FIG. 3.

The ring 44 comprises a metal sleeve 46 to which an elastomeric ring 48 is attached. A pair of flange guards 51 are attached to the metal sleeve 46 and to the elastomeric ring 48 at either side of the latter. The flange guards 51 prevent deformation of the elastomeric ring 48 when subjected to high pressure situations. It will be appreciated that the depth of metal ring 46 is approximately equal to the difference in the exterior diameter of the pipe 12 and the exterior diameter of the reduced diameter portions 40 and 42 of pipe sections 12 and 18. This is so that the metal ring 46 will reside within the space provided between the reduced diameter portions 40 and 42 and the split clamp 50.

Split clamp 50 is essentially a cylindrical ring which has been split into two identical portions along its axis. The split clamp 50 is constructed from a cylindrical piece of metal having an interior diameter roughly equal to the exterior diameter of the grooves 24, 26, 28 and 30. Grooves 41, 43 and 45 are formed annularly about the interior of the split clamp 50, such that a first pair of inwardly extending ribs 52 and 54 and a second pair of interiorly extending ribs 56 and 58 are formed. The ribs 52, 54, 56 and 58 are positioned on split clamp 50 so as to mate with the grooves 24, 26, 28 and 30 formed on pipe sections 12 and 18. The depth of the grooves in pipe sections 12 and 18 is roughly the same as the depth of the grooves in split clamp 50 such that there is a tight fit between the pipe sections 12 and 18 and split clamp 50 when mated. The axial width and placement of grooves 41, 43 and 45 are such that annular spaces 60, 62, 64 and 66 are formed between each split clamp ribs and the inwardly adjacent pipe section lug. Into each of these spaces is inserted a bearing ring 67 manufactured from a compressible material such as a plastic, zinc, aluminum/bronze or bronze. Note also that groove 43 is sufficiently wide to provide not only for spaces 62 and 64, and to receive lugs 34 and 36, but extends the entire distance between lugs 34 and 36 to accommodate ring 44 as well.

The split clamp 50 is held into position by a pair of retainer rings 68 and 70. It will be noted that the exterior diameter of split clamp 50 is reduced at either end thereof, and that the interior diameter of these retainer rings 68 and 70 is equal to that reduced diameter so that the retainer rings will fit onto the ends of split clamp 50 but will not move inwardly therefrom. A pair of spiral retainer rings 72 and 74 fit in appropriately sized grooves in the exterior of the reduced diameter portion of split clamp 50 to hold the retainer rings in place.

Although specific embodiments of this invention have been shown and described, it will be apparent to those skilled in the art that many modifications of those embodiments may be made without departing from the inventive concepts claimed herein. Accordingly, the protection of this patent is not limited to the specific embodiments set forth above, but is of the full breadth and scope of the appended claims.

What is claimed is:

1. A high pressure swivel coupling comprising:
   (a) a first pipe section, the first end thereof having a uniform exterior diameter and further having formed therein at least two exterior circumferential grooves;
   (b) a second pipe section, the first end thereof having a uniform exterior diameter equal to that of said first pipe section, said second pipe section also having formed therein at least two circumferential grooves;
   (c) said first and said second pipe sections facing one another in mirror-image fashion and held in place by a split clamp, said split clamp having a first pair of interiorly extending ribs which mate one each with said circumferential grooves on said first pipe section and a second pair of interiorly extending ribs which mate one each with said exterior circumferential grooves in said second pipe section such that the combination of the pipe sections and the split clamps is largely symmetrical about its center point;
   (d) compressible bearing ring within each said exterior circumferential groove on said pipe sections against which each said rib abuts; and
   (e) means for holding said split clamp in position on said first and second pipe sections.

2. The swivel coupling of claim 1 wherein said grooves, and said ribs, are substantially rectangular in axial cross-section.

3. The swivel coupling of claim 1 wherein said means for holding said split clamp in position on said first and second pipe sections comprises:
   (a) reduced exterior diameter portion on each end of the said split clamp such that a pair of shoulders are formed therein;
   (b) a pair of retainer rings having an interior diameter equal to the reduced exterior diameter on said split clamp, such that said retainer rings slide on to said split clamp and abut against said shoulder; and
   (c) a pair of spiral retainer rings which fit into an appropriately sized groove in either end of said split clamp to retain said retainer ring in position on said split clamp.

4. A high pressure swivel coupling comprising:
   (a) a first pipe section, the first end thereof having a uniform exterior diameter and further having at least two exterior circumferential grooves formed near the end thereof;
   (b) a second pipe section, the first end thereof having a uniform exterior diameter equal to that of said first pipe section, said second pipe section also having at least two circumferential grooves formed near the end thereof;
   (c) said first and said second pipe sections facing one another, the proximal ends of each having a section of reduced exterior diameter, said first and said second pipe sections held in place by a split clamp, said split clamp having an interior cylindrical diameter roughly equal to the exterior diameter of said first and second pipe sections, said split clamp having a first pair of interiorly extending ribs which mate one each with said circumferential grooves on said first pipe section and a second pair of interiorly extending ribs which mate one each with said exterior circumferential grooves in said second pipe section;
   (d) a ring between said first pipe section and said second pipe section, said ring comprising:
      (i) a cylindrical metal sleeve having an exterior diameter roughly equal to the interior diameter of said split clamp and an interior diameter roughly equal to the reduced exterior diameter on the proximal ends of said first and said second pipe sections;
      (ii) a beveled elastomer ring attached to said metal sleeve; and (iii) a guard flange attached to each side of said elastomer ring and to said cylindrical metal sleeve;

(e) a compressible bearing ring within each said exterior circumferential groove against which each said rib abuts; and (f) means for holding said split clamp in position on said first and second pipe sections.

* * * * *